Nov. 3, 1964    D. D. TAYLOR ET AL    3,155,553
ELECTRICAL DETONATOR
Filed Oct. 24, 1961

INVENTORS
DANIEL D. TAYLOR
C. C. BRAWNER
BY HIS ATTORNEYS
HARRIS, KIECH, RUSSELL & KERN 3,155,553
ELECTRICAL DETONATOR
Daniel D. Taylor, Altadena, and Carle C. Brawner, Monrovia, Calif., assignors to Beckman Instruments, Inc., a corporation of California
Filed Oct. 24, 1961, Ser. No. 147,354
5 Claims. (Cl. 149—21)

This invention relates to electrical detonators in general and is directed specifically to the development of a low voltage electrical detonator suitable for firing at low voltages, for example 1.5 volts.

Military specifications for small electrical detonators are very stringent, requiring that the detonator be not larger than approximately ⅓" diameter by ½" length. An acceptable detonator should operate over a temperature range from —65° F. to 160° F. in response to firing energies of less than 200 ergs and with a firing time preferably not exceeding 100 microseconds. The detonator must be capable of mass production and be chemically stable at all humidities over the temperature range and be capable of withstanding rough handling and accelerations to 50,000 $g$.

A fairly recent development involves an electrical detonator containing finely divided detonating material (such as lead azide) and particles of an amorphous carbon, preferably a carbon black produced either by the thermal decomposition or partial combustion of a hydrocarbon. With the advent of the foregoing conductive mix electrical detonator, it became possible to produce electrical detonators of the foregoing specification on a mass production basis. A conductive mix containing dispersed electrical conductive carbon particles provides conductive paths of a microscopic cross-sectional dimension, whereby an ignition temperature may be generated in the detonating body by an extremely small electric current. Normally the explosive component of the conductive detonating mix is entirely or principally lead azide. The conductive mix is preferably employed adjacent a main charge which may be, for example, pure lead azide or some other suitable material. The conductive mix electrical detonator is discussed in further detail in Patent No. 2,918,871, issued December 29, 1959, to Daniel D. Taylor.

As described in Patent No. 2,918,871, a conductive mix detonator is an electrically fired detonator in which the path between two electrodes is completed through a suitable mixture of nonconductive explosive and a conductive additive of carbon, the kind and amount of carbon being determined by the input specification. Degree of mixing of carbon and nonconductive explosive must be sufficiently complete in order that successively small amounts, for example, two to ten mg. of a mix will be uniform in resistance and sensitivity.

The early carbon conductive mix detonator was fired at a voltage of about 40 volts. It is now desired to produce electrical detonators capable of operating at very low voltages, for example, 1.5 volts or thereabouts. It was discovered that conductive mix detonators containing acetylene black or other suitable carbon have a lower voltage limit of around 10 volts for reliable firing. Other electrically conductive materials have been examined, but none meet the specification of 1.5 volts. Among the materials investigated has been gold leaf. It was found that gold leaf even after long continued milling still contains particles large enough to bridge the gap and conduct the available energy without detonation of the explosive.

It has now been discovered that a suitable conductive mixture for use in an electrical detonator capable of low voltage firing may be prepared using as the electrical conductive material in the mixture gold powder having particles of a small dimension. More particularly, at least 90% of the particles of the gold powder should have a maximum dimension of not greater than 15 microns. The dimension of 15 microns is that of the gold powder in the mixture following milling of the conductive material and gold. The preferred gold particles are irregular in shape and have sharp points and edges. An available gold powder of this description commonly has a large number of particles with maximum dimensions in excess of 25 microns before milling. Another commercially available gold powder comprises gold particles of a smaller size and of a more regular configuration (generally globular in shape). It has been found that somewhat larger amounts of the latter globular gold powder is required than the gold powder of more irregular configuration. Flaked gold leaf is unsuitable.

The conductive mix of the invention may be advantageously used in electrical detonators taking any of the several forms illustrated and described in Patent No. 2,918,871. The preferred electrical detonator for use with the improved conductive mixture takes a somewhat different form than those described and illustrated in Patent No. 2,918,871 and has an improved method of fabrication. The preferred embodiment of the electrical detonator of the invention has a small cylindrical container closed at one end and open at the other end. A disc plug is sized to fit within the open end of the container to provide a closure. Preferably, a hole is drilled centrally of the disc plug, which is formed of stainless steel. A plastic coated steel wire is placed in the centrally disposed oversized hole of the disc plug.

The plastic of the coated wire is capable of withstanding fracture with application of a high swaging pressure. The swaging pressure effects an inward flow of metal towards the hole of the plug, bringing about a deformation or necking down of the wire and thereby a securing of the wire within the disc plug. Among the suitable plastics is polyvinyl acetal formaldehyde resin. A particularly suitable polyvinyl acetal formaldehyde resin has a viscosity at 30° C. of 4000 to 4600 cps. A polyvinyl acetal formaldehyde resin that may be employed is marketed under the trademark "Formvar," produced by Shawinigan Resins Corporation. It is important that the plastic coating of the wire be uniformly applied. A too hard plastic coating due to excessive curing will fracture during swaging but, if not hard enough because of undercuring, the coating will be displaced by the high swaging force, with the result that an excessive number of shorted disc plugs will be produced.

The disc plug is preferably a punched slug of Type 302 stainless steel which is drilled to accept the plastic coated wire. The drilled hole can be as much as .005" oversize with no disadvantage. The detonator cylindrical container or case is a drawn stainless steel cup such as is commonly used for the purpose. A base charge and intermediate charge are successively loaded into the detonator case and consolidated under a high pressure, normally a pressure of more than 15,000 p.s.i., and preferably in the range of 25,000 to 40,000 p.s.i. The conductive mix charge is then added on top of the pressure consolidated intermediate charge. The conductive mix charge is not pressure consolidated at this time but is later packed into operative position with the insertion of the finished disc plug into the detonator case. The disc plug is normally oversized by .0005" to .001" and is inserted into the detonator case by a spring loaded plunger which maintains a high consolidation pressure generally within the range of 5,000 to 10,000 p.s.i. on the disc plug during a subsequent crimping operation which fixes the disc plug within the case. Without the use of the spring loaded plunger, there is a tendency for the detonator case to expand slightly during crimping, thus permitting the disc plug to rise and impair the contact between the disc plug and the conductive mix.

Reference to the figures of the drawings of the earlier Patent No. 2,918,871 will show that the centrally disposed electrode carried by the disc plug is provided with a sharp point reaching downwardly into the conductive mix, which conductive mix is generally confined, but not always, within a cavity of the disc plug or an associated ring. In the preferred embodiment of the electrical detonator of the present invention, the centrally disposed electrode of the disc plug at its inner end is flush with the inner surface of the disc plug and there is no conductive mix filled cavity within the disc plug proper. The detonator of the improved design is readily manufactured and with the improved conductive mix meets the rigid specifications for electrical detonators and in addition facilitates firing at very low voltages heretofore not possible.

It has been experienced that a stainless steel disc plug whose inner surface has been freshly ground and the disc plug immediately assembled into a finished detonator, will show a lower resistance than a similar disc plug which has been allowed to stand for some hours in air following grinding and before assembly into a completed electrical detonator. Steel plugs which have been standing in air for about three months before assembly produce unsatisfactory firing even though the conductive mix and assembly procedures are unchanged. Stainless steel is said to owe its corrosive resistance to the formation of a very thin, strongly adherent oxide layer which effectively protects the metal from further oxidation. It develops that this thin oxide layer has no noticeable adverse effect on detonators fired at higher voltages, say of 40 volts, but it has now been discovered that at lower voltage firings, say of 1.5 volts and thereabouts, the normal thin oxide layer of stainless steel does present an adverse effect, increasing the required firing voltage, even though the thin oxide layer does not substantially affect the measured resistance of the assembly.

One procedure that has been developed for eliminating the adverse effect of the thin oxide layer on stainless steel is to treat the disc plug immediately following grinding in an electrical, cleaning bath and then applying to the oxide free surface, before significant oxidation can occur, a metal that does not readily form an objectionable oxide layer. There are a number of metals which can be applied to stainless steel as an electroplate where the detonating material is other than lead azide; for example, copper, nickel, zinc, and cadmium as well as high copper alloys such as brass, and high nickel alloys such as Monel. However, where the conductive mix electrical detonator contains lead azide, the electrical plating metals that may be used are severely limited to those which are compatible with the azide. It has been found that gold and tin are both quite acceptable in contact with lead azide and that neither forms the objectionable oxide layer which creates the problem in the instance of stainless steel. The noble metals of platinum, rhodium, and palladium may be used with lead azide to plate the disc plug.

The various objects and advantages of the invention will become more apparent in the following detailed description of preferred practices of the invention considered with the accompanying drawing.

Figure 4:
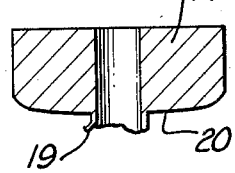
FIG. 4 is a sectional view of a disc plug of the type employed for closing the open top of the detonator of FIG. 1, the view depicting the condition of the disc plug immediately following drilling of the hole and before removal of a burr formed on the inner side of the disc plug.
Figure 5:
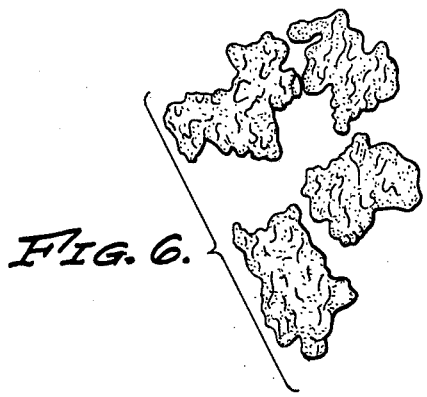
Figure 6:
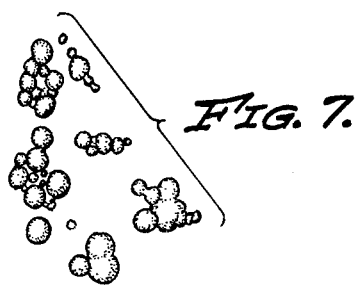
Figure 7:
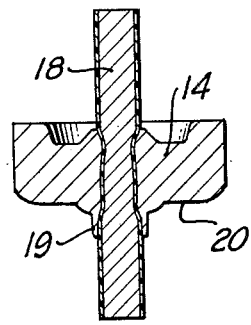

FIG. 5 is a sectional view of the disc plug of FIG. 4 following application of swaging force to neck down an electrode wire placed in the hole of the disc plug, the view illustrating an intermediate stage of fabrication before removal of the excess electrode wire at the inner face of the disc plug to present a flush juncture of disc plug and electrode wire and before grinding of the inner surface of the disc plug;

FIG. 6 is a view copied directly from a photomicrograph of several particles of a gold powder particularly suitable for use in the improved detonating mixture of the invention; and FIG. 7 is another view copied directly from a photomicrograph of several particles of a somewhat less but suitable useable gold powder, both photomicrographs on which FIGS. 6 and 7 are based having been taken at a magnification of 750 diameters.

Figure 1:
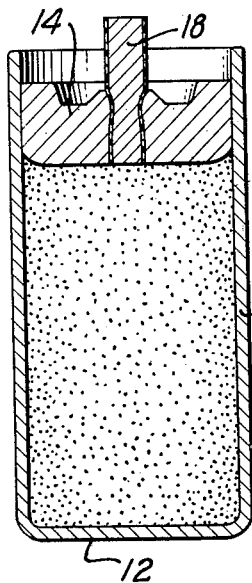
FIG. 1 is a greatly enlarged sectional view of a preferred form of the electrical detonator of the invention, the view showing the detonator in an advanced stage of fabrication.
Figure 2:
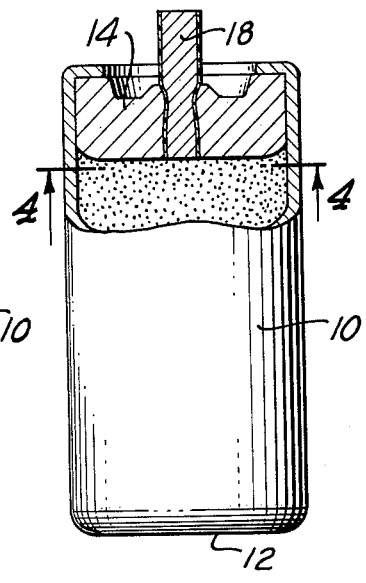
FIG. 2 is a sectional view similar to FIG. 1, showing the completed electrical detonators.
Figure 3:
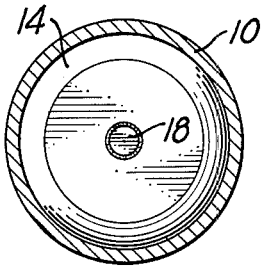
FIG. 3 is a transverse section taken along line 4—4 of FIG. 2.

A preferred form of the detonator of the invention is illustrated in FIGS. 1 and 2 wherein the container structure is seen to include a cylindrical shell or case 10 that is open at one end and is closed at the other end by a bottom wall 12, the lower corners being preferably rounded. The cylindrical shell 10 which serves as one of the electrodes is normally a drawn stainless steel cup. The container structure may be very small, as small as approximately ⅜" long and less than ¼" in diameter. Such a cylindrical shell 10 may be permanently closed in various suitable manners; for example, by means of a plug structure shown as a disc plug 14 which fits into the open end of the cylindrical shell 10 for engagement therewith. In the fabrication of the detonator, the disc plug 14 is advanced into the cylindrical shell 10 with force to compress the contents of the shell. Subsequently, the upper edge of the cylindrical wall of the shell 10 is crimped inwardly into engagement with the outer perimeter of the upper surface of the disc plug 14 as shown in FIG. 2, to confine the enclosed material permanently under the desired pressure.

The disc plug 14 is preferably a punched slug of Type 302 stainless steel which is drilled to accept a plastic coated wire 18. The drilled hole is somewhat oversize. FIG. 4 is a cross section of the disc plug 14 following drilling with a burr 19 resulting from the drilling operation still in place. It is recommended that the burr not be removed at this time because of the possibility of returning part of the burr inside of the hole where it will interfere with assembly. The disc plug 14 is preferably drilled so that the burr appears on the inside slightly convex face 20 of the plug, from where it is subsequently removed in the finishing of the disc plug. Following the drilling of the hole in the disc plug 14, the slightly undersized coated wire 18 is positioned within the hole of the disc plug. As earlier described, the wire 18 is coated with a plastic capable of withstanding fracture with application of high swaging force to the disc plug 14. The disc plug 14 containing the coated wire 18 is positioned within a suitable bushing fixture which closely controls the outside diameter and finish of the completed disc plug 14 upon the application of a high swaging force, generally in the range of 3000 to 5000 pounds, to the end of the plug. The swaging force is applied through a doughnut-shaped die to the end of the plug, opposite the burr 19. This high swaging force brings about an inward flow of metal towards the hole of the disc plug 14, resulting in a necking down of the wire 18 which as best seen in FIG. 5 secures the wire within the disc plug. Simultaneously with the inward flow of metal, there is an outward flow of metal to give the diametrical dimension and finished surface of the completed plug. The plug is ejected from the fixture bushing by a plunger. The tough plastic coating of the wire, which is preferably made from the plastic "Formvar," transmits the high pressure without fracturing. After swaging, the wire projecting from the convex face 20 of the disc plug 14 is ground off short and at the same time the aforementioned burr is removed.

Preferably the convex face of the disc plug 14 is ground with a series of abrasive papers with the surface being finished with 600 grade Carborundum. This grinding operation removes the thin oxide film which is characteristic of stainless steel. At this point the detonator must be promptly assembled if the detonator is to show a low electrical resistance. It has been found that stainless steel plugs allowed to stand for several hours in air produce unsatisfactory firings, even though the conductive mix and assembly procedures are otherwise the same. The cause of this malfunction, as earlier explained, is due to a thin oxide layer that forms on the surface of the stainless steel.

In the preferred manner of fabricating the detonator of the invention, the disc plug 14 subsequent to the grinding operation is placed in a conventional electro-cleaning bath and subjected to electroplating with gold or tin, or other suitable metal that does not readily form an objectionable outside layer.

The conductive mix of the invention is prepared by milling or grinding gold powder with a suitable, finely divided, detonating material such as lead azide, lead styphnate, diazodinitrophenol and the like. Preferably lead azide is used alone in combination with the powdered gold. Dextrinated lead azide may be employed in the invention although the azide preferably used is produced by precipitation of the lead azide in the presence of polyvinyl alcohol. This form of lead azide is commonly known as PVA-lead azide. The percentage of gold powder mixed with the detonating material may vary between 1% and 25% by weight. Particularly satisfactory results have been attained with various intermediate proportions of 8–20% by weight.

It has been found that the dimensions of the particles of the gold powder used are critical. Gold leaf broken into small particles is unsuitable. Even after long continued milling some particles of the gold leaf remain large enough to bridge the gap and conduct the available energy without detonation. The gold powder suitable for use in the conductive mix of the invention is characterized by having at least 90% of its particles with a maximum dimension of not greater than 15 microns after milling. A particularly suitable gold powder is illustrated in the photomicrograph of FIG. 6. It will be noted that the particles of this preferred gold powder are generally irregular in configuration and have many jagged edges. Another gold powder that may be used in the conductive mix of the invention is the powder illustrated in the photomicrograph of FIG. 7, the particles of which are much smaller than the particles of the acceptable powder of FIG. 6. It will be also noted that the particles of FIG. 7 are regular in shape, being generally globular and sometimes suggestive of molecular models. Both of the gold powders of FIGS. 6 and 7 are gold precipitates. The globular gold powder of FIG. 7 is required in an approximately 25% greater concentration than the powder of FIG. 6 to achieve the same results in a mixture. Both gold precipitates have a purity far beyond the usual karat scale.

The gold powder and the particles of detonating material are mechanically intermixed to a degree sufficient to insure substantially uniform distribution of the gold throughout the mass. The equipment and manner of mixing as described in Patent No. 2,918,871 may be employed. The mixing is done wet, using a volatile solvent, commonly methanol or acetone.

Detonators of varying structures may be used with the improved gold-containing conductive mix of this invention, for example, various ones of the detonating container structures illustrated earlier in Patent No. 2,918,871.

The following is a description of an assembly procedure for the manufacture of the detonator of FIGS. 1 and 2. A layer of base charge is first placed in the cylindrical shell 10 following which an intermediate charge layer is introduced and the two layers are preferably compressed at this time. Usually compaction pressures will exceed 10,000 p.s.i. The special gold-containing detonating mix of the invention is then placed on top of the main charge and the disc plug 14 is then inserted into the cylindrical shell 10, as shown in FIG. 1, and is forced downwardly to compact the contents of the container to the desired degree. As mentioned earlier, the disc plug 14 is preferably slightly oversize and to insert it into the detonator cylindrical shell 10 a spring loaded plunger is employed. The cylindrical shell 10 is then crimped over the top of the disc plug 14, giving the detonator the appearance illustrated in FIG. 2. Through the crimping operation, the contents of the cylindrical shell 10 are held at the desired pressure. Usually the pressure of compaction employed for the insertion of the disc plug 14 is in the range of 5,000 to 10,000 p.s.i.

The improved detonator of the invention permits reliable low voltage firing which has not been heretofore possible with carbon black because of its insufficient sensitivity. It has been established by test that the gold precipitate conductive mixture of the invention will consistently fire with voltages of 1.5 and downward and with firing times of less than 100 microseconds, carbon conductive mixtures become unreliable with firing voltages in the range of 10 to 15. A number of factors contribute to the successful operation of the preferred embodiment of the improved detonator including the improved conductive mix, electroplating of the electrodes and the particular structure of the disc plug 14.

Although an exemplary embodiment of the invention has been disclosed herein for purposes of illustration, it will be understood that various changes, modifications, and substitutions may be incorporated in such embodiment without departing from the spirit of the invention as defined by the claims which follow.

We claim:

1. In a conductive mixture for use in an electrical detonator, said mixture containing finely divided detonating material and particles of an electrically conductive material, the improvement wherein the particles of electrically conductive material comprise gold powder with at least 90% of the particles of the gold powder having a maximum dimension of not greater than 15 microns, said gold powder comprising 1% to 25% of said mixture by weight.

2. A conductive mixture in accordance with claim 1 wherein the gold powder is a gold precipitate.

3. In a conductive mixture for use in an electrical detonator, said mixture containing finely divided detonating material and particles of an electrically conductive material, the improvement wherein the particles of the electrically conductive material comprise gold powder and the particles of the gold powder are characterized by irregular shapes and jagged edges and wherein at least 90% of the particles have a maximum dimension of not greater than 15 microns, said gold powder comprising 1% to 25% of said mixture by weight.

4. A conductive mixture in accordance with claim 3 wherein the gold powder is a gold precipitate.

5. In a conductive mixture for use in an electrical detonator, said mixture containing finely divided lead azide and particles of gold powder characterized by irregular shapes and jagged edges, and wherein at least 90% of the particles have a maximum dimension of not greater than 15 microns, said gold powder being a gold precipitate and comprising 8% to 20% of said mixture by weight.

References Cited in the file of this patent

UNITED STATES PATENTS

| | | |
|---|---|---|
| 2,918,871 | Taylor | Dec. 29, 1959 |
| 2,921,520 | Stonestrom | Jan. 19, 1960 |
| 2,942,546 | Liebhafsky et al. | June 28, 1960 |
| 2,964,835 | Hay | Dec. 20, 1960 |
| 2,986,090 | Doerpinghaus | May 30, 1961 |
| 3,001,267 | Heibel et al. | Sept. 26, 1961 |
| 3,006,746 | Toulmin | Oct. 31, 1961 |
| 3,062,143 | Savitt et al. | Nov. 6, 1962 |